(12) United States Patent
Liang et al.

(10) Patent No.: US 10,826,392 B2
(45) Date of Patent: Nov. 3, 2020

(54) VOLTAGE REGULATOR WITH AN ADAPTIVE OFF-TIME GENERATOR

(71) Applicant: TEXAS INSTRUMENTS INCORPORATED, Dallas, TX (US)

(72) Inventors: Jian Liang, Shanghai (CN); Yangwei Yu, Hangzhou (CN); Chen Feng, Shanghai (CN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 16/294,054

(22) Filed: Mar. 6, 2019

(65) Prior Publication Data

US 2020/0127565 A1 Apr. 23, 2020

Related U.S. Application Data

(63) Continuation of application No. PCT/CN2018/110580, filed on Oct. 17, 2018.

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01); *H02M 2001/0025* (2013.01)

(58) Field of Classification Search
CPC ......... H02M 3/156; H02M 2001/0009; H02M 2001/0025; H02M 2003/1566
See application file for complete search history.

(56) References Cited

U.S. PATENT DOCUMENTS 6,366,070 B1 * 4/2002 Cooke ................. H02M 3/1588
323/222
2015/0002109 A1 1/2015 Bianco

FOREIGN PATENT DOCUMENTS

| CN | 201528453 U | 7/2010 |
| CN | 103151925 A | 6/2013 |
| CN | 104022645 A | 9/2014 |

(Continued)

OTHER PUBLICATIONS

Search Report for Application No. PCT/CN2018/110580, dated Jul. 24, 2019, 2 pages.

(Continued)

*Primary Examiner* — Gary L Laxton
(74) *Attorney, Agent, or Firm* — Lawrence J. Bassuk; Charles A. Brill; Frank D. Cimino

(57) ABSTRACT

A voltage regulator circuit includes a first transistor, an inductor, and a diode. The inductor connects to the diode at a switch node. The voltage converter produces an output voltage that is larger than an input voltage. The first transistor has on and off states and electrically couples a node to ground when in the on state. An error amplifier circuit generates an error signal based on a difference between a reference voltage and a voltage indicative of the output voltage. The error signal causes the first transistor to transition from the on to the off state. An adaptive off-time generator circuit couples to the input voltage node, and generates a signal to cause the first transistor to transition from the off to the on state. The time the first transistor is in the off state is inversely proportional to the time the first transistor is in the on state.

14 Claims, 4 Drawing Sheets

(56) References Cited

FOREIGN PATENT DOCUMENTS

TW 200847593 A 1/2008

OTHER PUBLICATIONS

CN10315925A, Machine Translation, 17 pages.
CN201528453U, Machine Translation, 10 pages.
CN104022645A, Machine Translation, 12 pages.
TW200847593A, Machine Translation, 15 pages.

* cited by examiner

VOLTAGE REGULATOR WITH AN ADAPTIVE OFF-TIME GENERATOR

BACKGROUND

A boost converter is a voltage regulator whose output voltage is greater than its input voltage. Some applications for the use of a boost converter (e.g., avalanche photodiode biasing and optical line terminals) benefit from a relatively high ratio of the output voltage to the input voltage. In one example, the input voltage may be three to four volts (e.g., 3.3V) and the output voltage may be in the range of 40V to 60V. In general, boost converters are switched mode circuits in which a transistor is turned on and off during each cycle of operation. A boost converter can operate in a continuous conduction mode (CCM) in which the current through a diode is always above 0 amperes, or in a discontinuous conduction mode (DCM) in which the diode current falls to 0 during part of each cycle of operation.

SUMMARY

A voltage regulator circuit includes a first transistor, and inductor, and a diode. The inductor connects to the diode at a switch node. The voltage converter produces an output voltage that is larger than an input voltage. The first transistor has an on and off states and electrically couples a node to ground when in the on state. An error amplifier circuit generates an error signal based on a difference between a reference voltage and a voltage indicative of the output voltage. The error signal causes the first transistor to transition from the on state to the off state. An adaptive off-time generator circuit couples to the input voltage node, and generates a signal to cause the first transistor to transition from the off state to the on state. The time the first transistor is in the off state is inversely proportional to the time the first transistor is in the on state.

BRIEF DESCRIPTION OF THE DRAWINGS

For a detailed description of various examples, reference will now be made to the accompanying drawings in which.

DETAILED DESCRIPTION

During CCM operation, the output voltage from a voltage regulator, such as a boost converter, is a function, at least in part, of its duty cycle (percentage of the commutation period during which the boost converter's switching transistor is on)—the larger the duty cycle, the larger the output voltage. The duty cycle of the boost converter during CCM operation can be difficult to increase large enough to achieve the heightened output voltages that are desirable in some applications such as those noted above (e.g., a 60V output based on 3.3V input). To achieve the desired output voltage levels, DCM operation may be used where duty cycle is generally not a hindrance to achieving higher output voltages.

For some applications, the switching frequency of the boost converter should be constant. A control circuit for a boost converter is used to control when and for how long the switching transistor is turned on during each commutation period. Some control systems for boost converters employ a fixed off-time generator, that is, a control circuit that controls turning on and off the switching transistor in the boost converter, where the amount of time the switching transistor is turned off remains constant from cycle to cycle. During an "on-phase" of each cycle, the transistor is turned on and current from an inductor flows through the transistor instead of through a diode to the load. The inductor stores energy during the on-phase by generating a magnetic field. The "off-phase" is the phase in which the switching transistor is turned off. The magnetic field created during the previous on-phase will be reduced to maintain the current to the load. The polarity of the inductor reverses in the off-phase compared to the on-phase which results in an increase of the voltage on an output node relative to the voltage on the input node.

Figure 1:
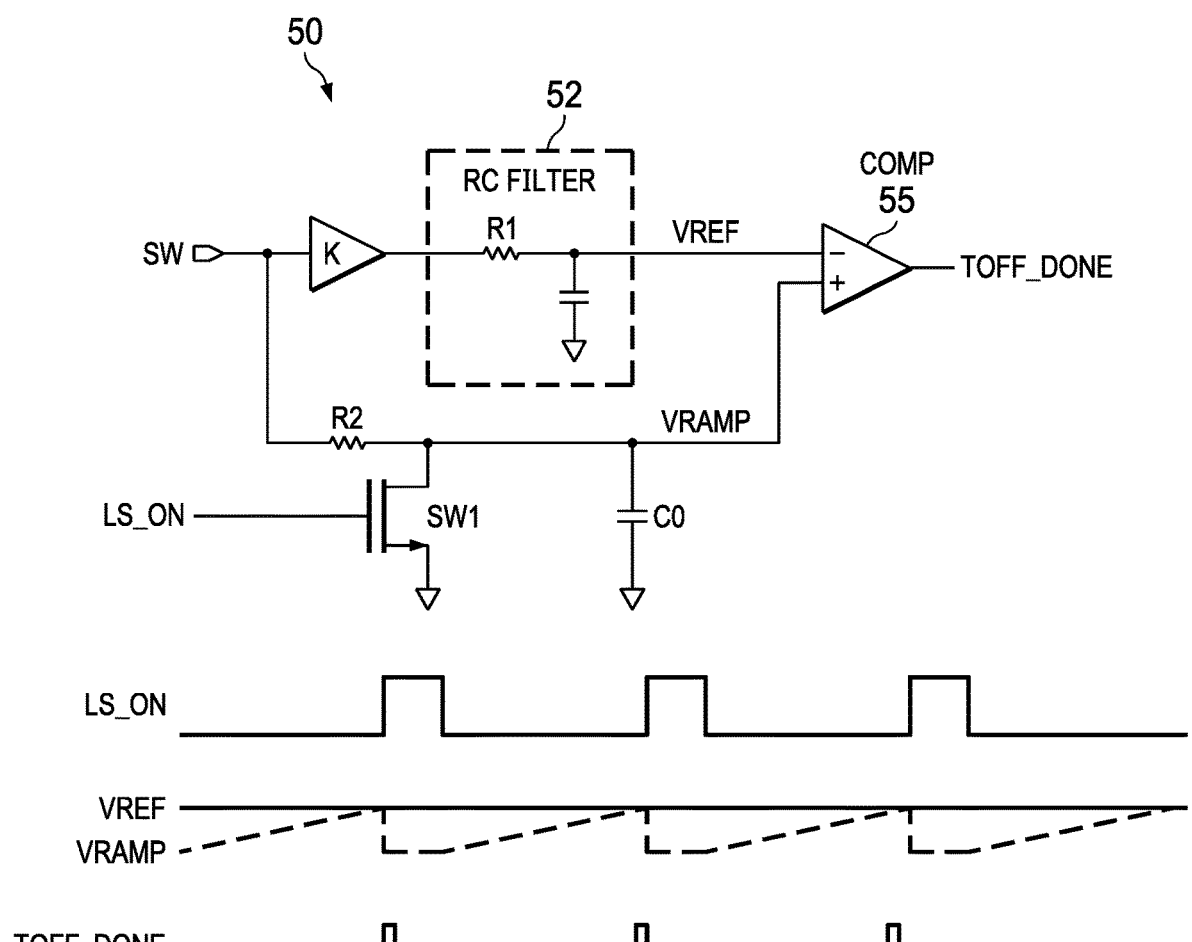
FIG. 1 illustrates an example off-time generator and an associated timing diagram.

FIG. 1 shows an example of an off-time generator 50 usable to turn off the switching transistor in a boost converter. The off-time generator 50 includes a driver K coupled to an RC filter 52 (comprising resistor R1 coupled to a capacitor C1. The input of the driver K is the switch node of the boost converter (i.e., the node between the inductor and the diode). The RC filter 52 provides a reference voltage vref which is provided to the negative input of a comparator 55. The switch node is also connected to a resistor R2 and R2 connected to the positive input of the comparator 55 at a node labeled vramp. A capacitor C0 connects the vramp node as well as a switch S1, which is controlled by a control signal LS_ON. When SW1 is on, vramp is pulled low; otherwise vramp increases linearly due to the switch node voltage application to R2 and C0.

The timing diagram in FIG. 1 shows the progression of LS_ON, vref, vramp, and the output of the comparator 55 (TOFF_DONE). TOFF_DONE pulses high as shown when vramp exceeds vref. As can be seen in FIG. 1, the spacing of the TOFF_DONE pulses is constant from pulse to pulse.

The length of each commutation cycle period is the sum of the on-time and the off-time. The switching frequency is the inverse of the cycle period. As current loading on the boost converter increases, the use of a fixed off-time generator (a control circuit that turns the switching transistor off for a fixed length period of time during each cycle as in the example of FIG. 1) causes the length of the on-time to increase to support the higher current loading. A fixed length off-time and an increasing on-time results in an increasing cycle period and thus a lower frequency at increasing current loading conditions. As noted above, some applications for the use of a boost converter benefit from a constant switching frequency, and thus variable switching frequency is counter-productive.

Further, some boost converter control circuits that control the switching transistor of the boost converter (as in the example of FIG. 1) use the voltage on the switch node (the node connecting the inductor, the diode and the switching transistor) to generate a ramp signal. The ramp signal is compared to a reference signal derived from the switch node voltage and the result of the comparison is used to determine when to turn off the switching transistor. The switch node voltage may experience "ringing" which infects the ramp signal with ringing as well. The ramp signal, with ringing, will not necessarily increase monotonically and thus may cross the reference signal multiples time during each commutation cycle. As a result, the switching transistor may be turned off, then on, and then back off during a given cycle. This behavior can impair the stability of the output voltage from the boost converter.

The described examples include a boost converter that uses an adaptive off-time generator. The length of the off-time is not fixed in the examples described herein and generally decreases as output current loading and the on-time increase. With an adjustable off-time, the cycle period remains constant and thus the switching frequency remains constant. Further, the disclosed adaptive off-time generator derives the ramp signal from the input voltage and not the switch node voltage node and thus avoids ringing from infecting the ramp signal.

Figure 2:
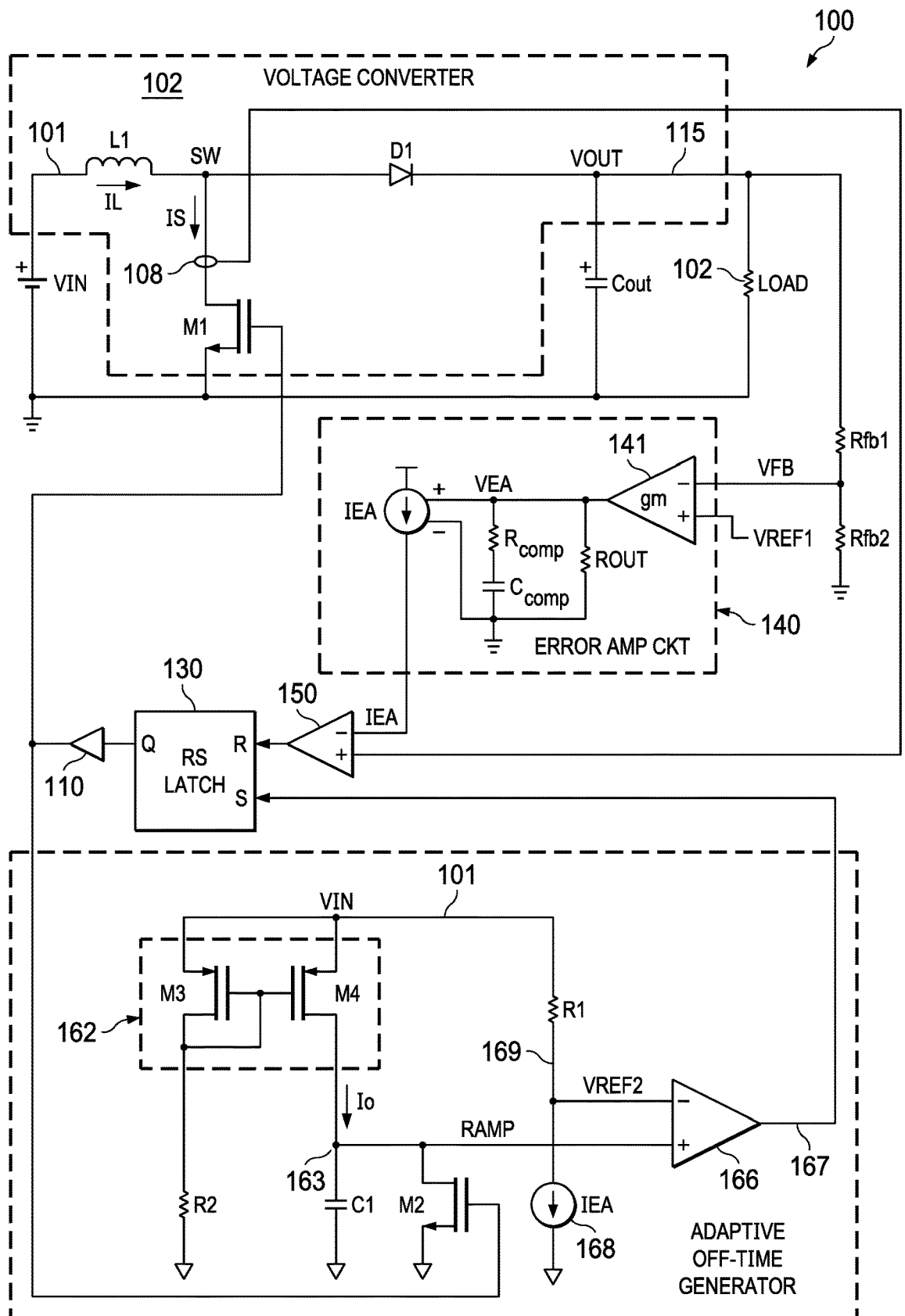
FIG. 2 illustrates an example implementation of a voltage regulator employing an adaptive off-time generator.

FIG. 2 shows an example of a voltage regulator circuit 100. The voltage regulator circuit 100 includes a voltage converter 102, an RS latch 130, an error amplifier circuit 140, a current comparator 150, and an adaptive off-time generator 160. The voltage converter includes an inductor L1, a diode D1, and a transistor M1. The inductor L1, diode D1, and transistor M1 are configured as a boost converter. The inductor L1 is connected to an input voltage node 101 whose voltage is VIN. The opposing terminal of L1 is connected to the anode of diode D1. The cathode of diode D1 is connected to an output voltage node 115, whose voltage is VOUT. The node interconnecting the inductor and the diode is the switch node (SW). Transistor M1 includes a pair of current terminals and a control input. In the example of FIG. 2, M1 comprises an n-type metal oxide semiconductor field effect transistor (NMOS), but can comprise a different type of transistor in other implementations (e.g., p-type metal oxide semiconductor field effect transistor (PMOS), bipolar junction transistor, etc.). One current terminal (drain) of M1 is connected to the switch node SW and the other current terminal (source) of M1 is connected to the ground node. The control input of M1 is the gate. The voltage on the gate of M1 is driven by gate driver 110 to cause M1 to be on or off. As an NMOS device, M1 is on when the gate-to-source voltage of M1 is larger than its threshold voltage, and M1 is off when VGS is less than the threshold voltage. The input to the gate driver 110 is coupled to the Q output of the RS latch 130. The gate driver 110 level-shifts the Q output signal from the RS latch 130 to control the on and off state of M1.

The load 102 receives the regulated output voltage VOUT from output voltage node 115. Gout represents a physical capacitor connected across the load 102 or the output capacitance of the load itself.

The error amplifier 140 includes a transconductance amplifier 141, a resistor Rcomp, a capacitor Ccomp, and a voltage-controlled current source IEA ("IEA" refers both to the voltage-controlled current source device as well as the magnitude of the current that flows from the current source device). The inverting input (−) of the transconductance amplifier 141 is connected to a node between a pair of feedback resistors Rfb1 and Rfb2. Feedback resistors Rfb1 and Rfb2 are connected in series between the output voltage node 115 and ground. Feedback resistors Rfb1 and Rfb2 comprise a voltage divider to divide down the voltage on the output voltage node, and thus the divided-down voltage (VFB) is provided to the inverting input of the transconductance amplifier 141. The non-inverting input (+) of the transconductance amplifier 141 is connected to a reference voltage (VREF1). An output resistor ROUT is connected to the output of the transimpedance amplifier 141. Based on the difference between VREF1 and VFB, the transconductance amplifier 141 generates a current through ROUT and the series combination of Rcomp and Ccomp. The voltage across the series-combination of Rcomp and Ccomp is VEA and thus VEA is proportional to the current produced by the transconductance amplifier 141. As VFB is provided to the inverting input of the transconductance amplifier 141, VEA is inversely proportional to VFB and, as VFB is proportional to VOUT, VEA is inversely proportional to VOUT. That is, as VOUT increases, VEA decreases and vice versa. VEA is used to control IEA and thus IEA is inversely related to VOUT.

The current comparator 150 compares IEA to the current through M1 (Is). The current IS is equal to the inductor current IL when M1 is on. In one example, a current sense device 108 (e.g., a sense resistor) is used to provide a current to the positive input (+) of the current comparator 150 that is proportional to IS. In some examples, the current signal from the current source device 108 may comprise a scaled-down version of IS. Current IEA is provided to the negative (−) input of current comparator 150.

The output of the current comparator 150 is low when current IEA is greater than current IS, and is high when current IS is greater than IEA. When IS exceeds IEA, the output of current comparator 150 becomes logic high and thus the R input of the RS latch 130 is asserted high. The R input being asserted high causes the RS latch to be reset and the Q output of the RS latch to be asserted low. Through driver 110, the output of the RS latch 130 drives the gate of M1 (and M2, discussed below). With the output being low, M1 (and M2) is off.

The adaptive off-time generator 160 includes a current mirror 162 (which includes transistors M3 and M4), resistors R1 and R2, capacitor C1, transistor M2, and a voltage comparator 166. Transistors M3 and M4 forming the current mirror are PMOS devices in this example, but can be other types of transistors in other examples. The sources of M3 and M4 are connected together and to the input voltage node 101 (VIN). The gates of M3 and M4 also are connected together. As such, the current through M3 is mirrored through M4. Resistor R2 is connected between the drain of M3 of the current mirror 162 and the ground node. Assuming for simplicity that M3 and M4 are zero threshold voltage devices, the current through M3 is given by VIN/R2 (where R2 represents the resistance value of resistor R2). The current through M4 is designated as Io and thus is also VIN/R2 (assuming a current mirror ratio of 1:1).

Capacitor C1 is connected between the drain of M4 of the current mirror 162 and the ground node. Current Io flows through C1 which causes the voltage on node 163 interconnecting M4 to C1 to increase linearly. The voltage on node 163 is designated as RAMP. Transistor M2 is connected between the drain of M4 of the current mirror 162 and the ground node. As shown, the drain of M2 is connected to node 163 and the source is connected to the ground node. The gate of M2 is connected to the Q output of the RS latch 130. As such, the on and off state of M2 is controlled by the Q output of the RS latch 130. When M2 is on, RAMP is pulled low. When M2 is off, RAMP is caused to increase linearly as current Io flows into capacitor C1 to charge the capacitor. Node 163 is connected to the non-inverting input of voltage comparator 166.

Resistor R1 is connected to the input voltage node VIN 101 and to a current source device 168 that is part of a current mirror along with the voltage-controlled current source EA. As such, IEA current flows through R1 (assuming a 1:1 current mirror ratio) and thus the voltage on node 169 interconnecting R1 to the current source device 168 (VREF2) is VIN−(R1*IEA).

Through the driver 110, the Q output of the RS latch 130 drives the gates of M1 and M2. When the C1 output is high, both M1 and M2 are on. When the Q output is low, both M1 and M2 are off. M1 being on causes current IL through the inductor l1 to increase linearly permitting the magnetic field created by the inductor L1 to increase. M2 being on causes RAMP to be pulled low and M2 being off permits RAMP to increase linearly due to current Io flowing through C1. While RAMP is less than VREF2, the output of the voltage comparator 166 is low. The output 167 of the voltage comparator 166 is provided to the S input of the RS latch 130. When RAMP exceeds VREF2, the output 167 of the voltage comparator 166 becomes logic high and thus the RS latch 130 is set thereby forcing its Q output to become a logic high. A logic high on the Q output of the RS latch turns on M1 and M2.

In operation, the voltage regulator switches back and forth between and an on-phase in which M1 is turned on and an off-phase in which M1 is turned off. RAMP exceeding VREF2 causes the S input of the RS latch 130 to be a logic high thereby starting the on-phase. Current IS exceeding IEA causes the RS latch to be reset thereby ending the on-phase and starting the off-phase. During the on-phase, in which M1 is on, current IL flows from the input voltage node 101, through the inductor L1, and through M1 to ground. While in the on-phase, the current through the inductor L1 ramps up linearly due to a relatively constant input voltage VIN being applied across the inductor L1. During the off-phase. M2 is off which permits RAMP to increase linearly.

Figure 3:
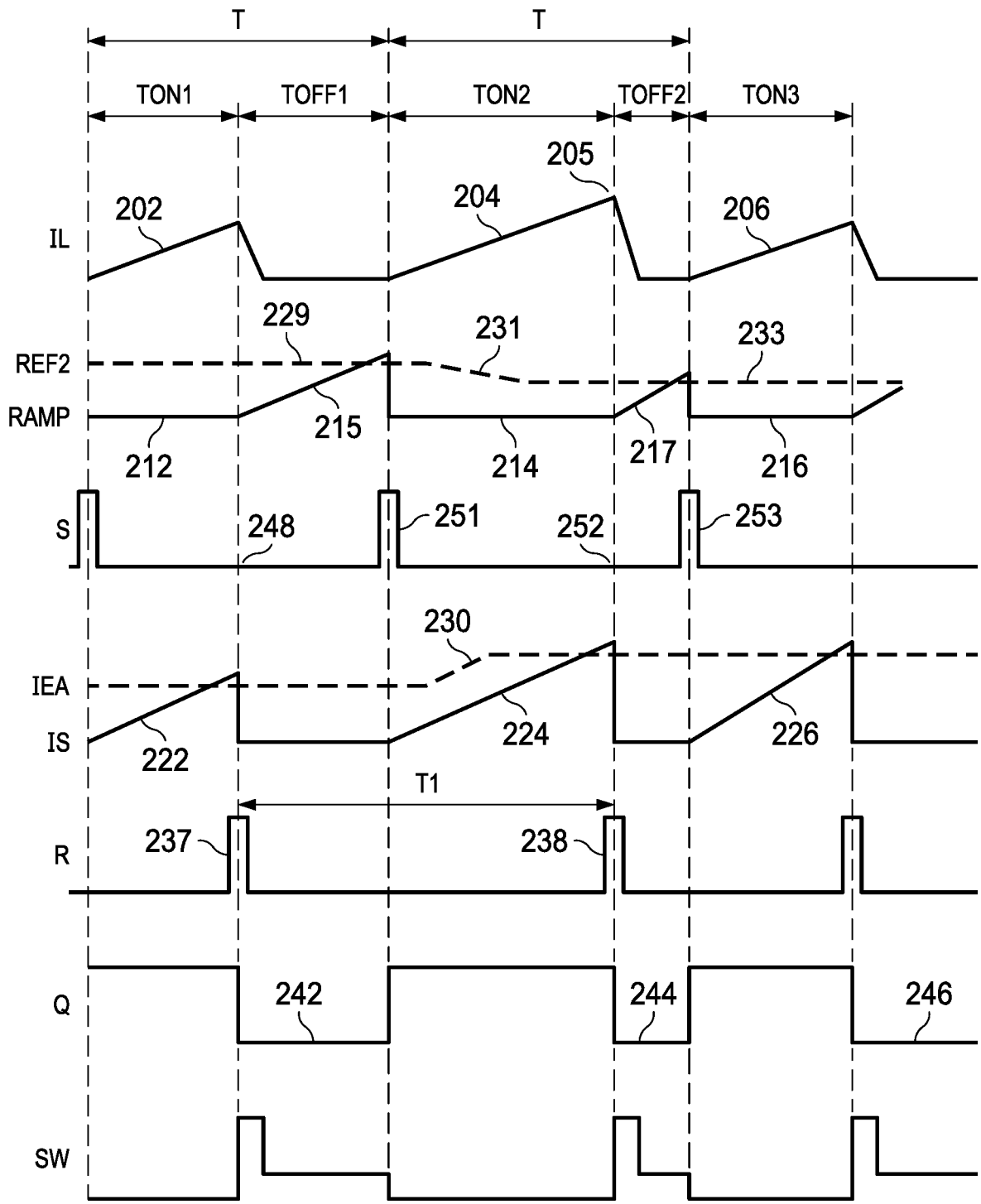
FIG. 3 is a waveform illustrating the operation of the voltage regulator of FIG. 2.

The example timing diagram of FIG. 3 will now be discussed in conjunction with the voltage regulator 100 of FIG. 2. The signals shown in FIG. 3 include IL, RAMP, REF2, the S and R inputs and the Q output of the RS latch 130, IS, IEA, and the voltage on the switch node SW. The example timing diagram of FIG. 3 illustrates three pulses on the S input of the RS latch 130. Each high level of the S input causes the Q output to become high. The Q output being high causes M1 to be on thereby starting an on-phase. FIG. 3 shows three on-phases designated as TON1, TON2, and TON3. During each TONx on-phase, IL increases linearly as shown at 202, 204, and 206. Also, shortly after the start of each on-phase with the Q output being high, M2 is turned on which causes RAMP to be pulled low as shown at 212, 214, and 216. Once RAMP is pulled low, RAMP will be smaller than VREF2 which causes the S input of the RS latch 130 to be pulled low. As such, the start of each on-phase is characterized by a relatively short pulse on the S input of the RS latch as shown in FIG. 3.

With IL increasing during the on-phases, IS (which is the sensed current through M1) also increases linearly as shown at 222, 224, and 226. When IS exceeds IEA, the R input of the RS latch 130 is asserted high by the current comparator 150. With the R input being high, the Q output of the RS latch is forced low as illustrated at 242, 244, and 246. The Q output being low turns off M1 and M2 thereby starting the off-phases. Two off-phases are illustrated in FIG. 3 as TOFF1 and TOFF2. During each off-phase, M2 is off which permits RAMP to increase linearly as illustrated at 215 and 217. When RAMP eventually exceeds REF2, the output 167 of the voltage comparator 166 becomes a logic high which causes the RS latch 130 to be set and its Q output to again be a logic high, thereby starting the next on-phase. By starting the next on-phase, the previous off-phase is ended.

The period of each cycle is designated as T and is the sum of the respective TON and TOFF phases. In accordance with the described examples, the period T remains the same across the cycles and thus the switching frequency remains relatively constant as well. The example of FIG. 3 illustrates the response of the adaptive off-time generator 160 to shorten the off-phases TOFF when an increase in loading experienced by the voltage regulator 100 from the load 102. When a load demands more current, the output voltage Vout will tend to drop. In order to maintain VOUT at a relatively constant level, the voltage regulator 100 reacts to a drop in VOUT by causing VOUT to increase. To boost VOUT, the adaptive off-time generator 160 causes the next on-phase to lengthen (e.g., TON2 is longer than TON1) to permit IL to increase to a higher peak value as depicted at 205, while shortening the subsequent off-phase (TOFF2 is shorter than TOFF1) to maintain T at a constant value. The increase in the length of TON occurs as follows. As VOUT drops in the face of increased current demand from the load, IEA increases as explained above. The increase in IEA is illustrated at 230. IS compared to IEA by the current comparator 150. As such, the output of the current comparator 150 (the R input of the RS latch 130) is delayed in time from being asserted high. FIG. 3 shows that the time T1 between R pulses 237 and 238 is longer than would have been the case had IEA not increased.

REF2 is inversely related to IEA. Thus, as IEA increases as shown at 230, REF2 decreases as illustrated at 231. The voltage comparator 166 of the adaptive off-time generator 166 compares RAMP to REF2. As REF2 becomes smaller, RAMP crosses REF2 sooner than would have been the case had REF2 not become smaller. RAMP exceeding VREF2 causes the RS latch 130 to be set thereby ending the present off-phase and starting the next on-phase. With REF2 at a lower value at 233 than at 229, RAMP which starts to linearly increase at the start of each off-phase reaches REF2 sooner with a lower value of REF2 than with a higher value of REF2. As such, S pulse 253 occurs sooner after the start 252 of its respective off-phase than was the case of S pulse 251 relative to the start 248 of its off-phase. The voltage on the switch node SW also is shown. The switch node voltage is equal to VOUT during the initial portion of the off-phase in which IL is decreasing rapidly. Once IL reaches its low point (zero), the switch node voltage drops to VIN. During the on-phase, the switch node voltage is zero as M1 is on.

The length of each TONx phase is related to the current-voltage relationship of the inductor L1. TON=L*Ipeak/VIN, where L is the inductance value of inductor L1 and Ipeak is the peak value of IL during a given on-phase. Ipeak is a function of IEA as Ipeak=K*IEA, where K is a design parameter (e.g., 10,000) implemented by a combination of relative values of the feedback resistors Rfb1 and Rfb2, the gain of the transconductance amplifier 141, and the values of ROUT, Rcomp and Ccomp. The length of TOFF is given by: TOFF=VREF2*R2*C1/VIN. As explained above, VREF2=Vin−(IEA*R1). Substituting this expression for VREF2 into the equation above for TOFF results in the following expression for TOFF: TOFF=R2*C1*(1−R1*IEA/VIN). As T=TOFF+TON, T=R2*C1*(1−R1*IEA/VIN)+K*L1*IEA/VIN, and thus:

$$T=R2*C1+IEA/VIN(K*L1-R1*R2*C1) \quad (1)$$

The right-hand term in Eq. (1) will be 0 when K*L1 equals R1*R2*C1. If the values of R1, R2, C1, L1, and K are chosen so as to zero-out the right-hand term of Eq. (1), then T is only a function of R2 and C1, which are constants. Thus, T will be constant regardless of variations in loading conditions on the voltage regulator 100.

In the described example, the adaptive off-time generator 160 uses the current IEA from the error amplifier circuit 140 to generate the adaptive off-time, not the voltage from the SW node or the output voltage node 115. The adaptive off-time generator 160 helps achieve constant and stable switching frequency in DCM operation for relatively high VOUT applications. By not using the switch node voltage (which may have ringing) to generate RAMP, RAMP is ensured to increase monotonically.

Figure 4:
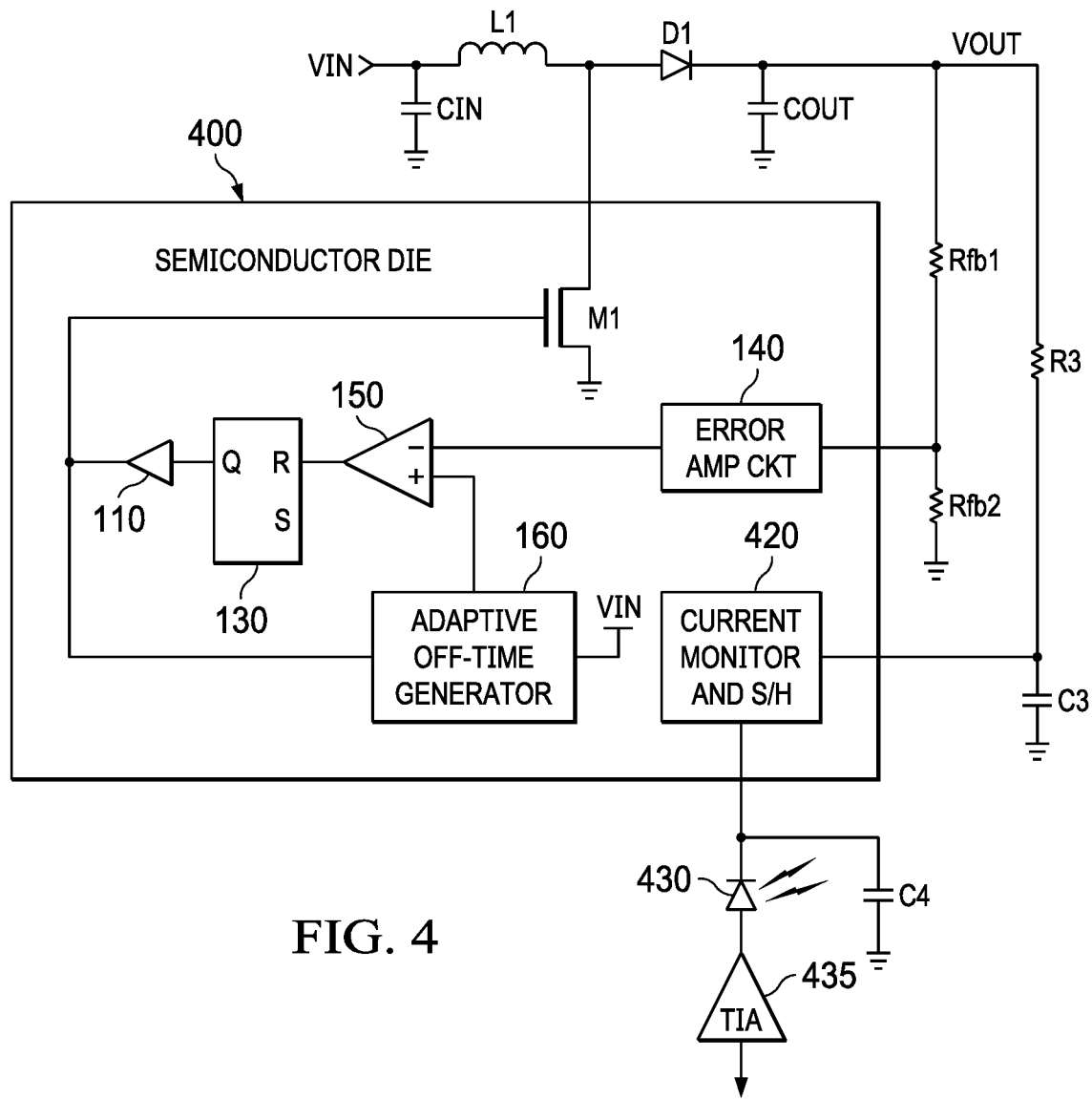
FIG. 4 is a system schematic illustrating an example application in which the voltage regulator using the adaptive off-time generator is used.

FIG. 4 shows an example of a system using the boost voltage regulator with its associated adaptive off-time generator 160 as described above. The system includes a semiconductor die 400 (packaged into a "chip"). The die 400 includes M1, the error amplifier circuit 140, the current comparator 150, the RS latch 130, driver 110, the adaptive off-time generator 160, and a current monitor and sample and hold circuit 420. External to the die 400 is the inductor L1, diode D1, capacitors Cout, CIN (and input capacitor) and C3, feedback resistors Rfb1/Rfb2 and resistor R3, and avalanche photodiode 430 and a transimpedance amplifier 435. The avalanche photodiode 430 is reversed biased using a relatively high voltage generated by the boost voltage regulator. The current monitor and sample and hold circuit 420 receives a voltage derived from the output voltage VOUT as the voltage on the node connecting R3 to C3 (R3 and C3 are connected in series between VOUT and ground. The transimpedance amplifier 435 converts the current produced by the avalanche photodiode 430 resulting from incident photons to a voltage. The current monitor and sample and hold circuit 420 includes one or more current mirrors to generate a current proportional to the current through the avalanche photo diode 430. The mirrored current is then sampled and held and provided, as desired to an external device (e.g., an analog-to-digital converter) to monitor the current the photo diode 430. The adaptive off-time generator 160 that is used as part of the boost voltage converter in this application provides any or all of the benefits discussed above such as achieving constant and stable frequency for operating the avalanche photodiode.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A voltage regulator circuit, comprising:
a voltage converter including:
an input voltage node, an output voltage node, and a ground node;
an inductor and a diode coupled in series between the input voltage node and the output voltage node and there being a switch node between the inductor and the diode;
a first transistor having a control terminal and having current terminals coupled between the switch node and the ground node;
an error amplifier circuit, having an input coupled to the output voltage node, having a reference voltage input, having an error signal output coupled to the control input of the first transistor, and including a voltage-controlled current source having an output coupled to the error signal output; and an adaptive off-time generator including:
a current mirror having an input connected to the input voltage node;
a capacitor connected between the current mirror and the ground node;
a first resistor and a current source device coupled in series between the input voltage node and the ground node, the current source device being coupled to the voltage controlled current source.

2. The voltage regulator circuit of claim 1, in which the adaptive off-time generator circuit includes a comparator, the comparator having a first input and a second input, the first input coupled to a node interconnecting the first resistor and the current source device, and the second input coupled to a node interconnecting the current mirror and the capacitor.

3. The voltage regulator circuit of claim 1, in which the adaptive off-time generator circuit includes a second transistor having a current terminal and a control input, the current terminal connected to a node interconnecting the current mirror and the capacitor, and the control input coupled to the control terminal of the first transistor.

4. The voltage regulator circuit of claim 1, in which the adaptive off-time generator circuit includes a second resistor connected between the current mirror and the ground node.

5. The voltage regulator circuit of claim 4, in which resistance values of the first and second resistor, a capacitance value of the capacitor, and an inductance value of the inductor are such that a sum of the on time and the off time is constant regardless of a magnitude of an output current from the voltage regulator circuit.

6. The voltage regulator circuit of claim 1, in which a sum of the on time and the off time is constant regardless of a magnitude of an output current from the voltage regulator circuit.

7. The voltage regulator circuit of claim 1, in which the on time is based on a load current produced by the voltage regulator circuit, the off time varies inversely with the on time, and a sum of the on time and off time of the first transistor remains constant.

8. The voltage regulator circuit of claim 1, in which the voltage converter includes a boost converter.

9. A voltage regulator circuit, comprising:
an inductor connected to an input voltage node;
a diode connected to the inductor at a switch node and to an output voltage node;
a first transistor connected between the switch node and a ground node, the first transistor having an on state and an off state and to electrically couple the switch node to ground when in the on state; and
an adaptive off-time generator circuit connected to the input voltage node, the adaptive off-time generator circuit to control a length of time of the off state of the first transistor based on an input voltage of the input voltage node, during each of a plurality of cycles, a sum of the time in which the first transistor is on and the time in which the first transistor is off is constant regardless of a magnitude of an output current through the output voltage node.

10. The voltage regulator circuit of claim 9, including an error amplifier circuit to generate an error current based on a difference between a first reference voltage and a voltage indicative of the output voltage, the error signal is to cause the first transistor to be off, and the adaptive off-time generator is to turn on the first transistor based on a comparison of a ramp signal derived from the input voltage and a second reference voltage that is proportional to the output voltage of the output voltage node.

11. The voltage regulator circuit of claim 9, in which the adaptive off-time generator includes a current mirror connected to the input voltage node, a capacitor connected between the current mirror and the ground node, a first resistor connected to the input voltage node.

12. The voltage regulator of claim 11, including a current source device coupled to the first resistor.

13. The voltage regulator of claim 12, including a voltage comparator having a first input and a second input, the first input coupled to a node interconnecting the first resistor and the current source device, and the second input coupled to a node interconnecting the current mirror and the capacitor.

14. The voltage regulator of claim 11, in which the adaptive off-time generator includes a second transistor having a control input, a first current terminal and a second current terminal, the first current terminal connected to a node interconnecting the capacitor and the current mirror, and the second current terminal connected to the ground node, and the control input is coupled to receive a control signal that is used to control a control input of the first transistor.

\* \* \* \* \*